United States Patent [19]
de Majistre et al.

[11] 3,754,972
[45] Aug. 28, 1973

[54] PHOSPHATE ESTERS AND THEIR USE AS ADHESIVE PROMOTERS

[75] Inventors: Robert de Majistre, Natrona Heights; Gordon M. Parker, Lower Burrell; Robert Sirkoch, Pittsburgh, all of Pa.

[73] Assignee: PPG Industries, Inc., Pittsburgh, Pa.

[22] Filed: Mar. 29, 1971

[21] Appl. No.: 129,113

[52] U.S. Cl.......... 117/72, 117/93.31, 117/161 UB, 117/161 UC, 117/161 K, 204/159.22, 260/75 P, 260/928
[51] Int. Cl.............................................. B44d 1/50
[58] Field of Search............... 117/93.31, 161 K, 117/161 UC, 161 UB, 72; 260/89.55, 75 P, 928, 952; 204/159.15, 159.22

[56] References Cited
UNITED STATES PATENTS

| | | | |
|---|---|---|---|
| 3,346,545 | 10/1967 | Sehm | 260/952 |
| 3,099,676 | 7/1963 | Lanham | 260/928 |
| 3,361,842 | 1/1968 | Applegata et al. | 117/93.31 |
| 3,455,801 | 7/1969 | D'Alelio | 117/93.31 |

*Primary Examiner*—Alfred L. Leavitt
*Assistant Examiner*—John H. Newsome
*Attorney*—Chisholm & Spencer

[57] ABSTRACT

A novel class of phosphate esters having a formula comprising either:

(A)

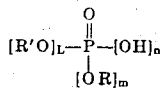

(B)

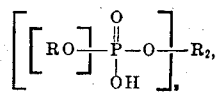

or (C)

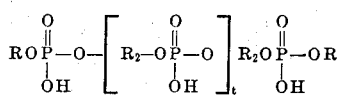

wherein R is selected from the group consisting of $$CH_2=\overset{H}{\underset{}{C}}-COOR_1,\ CH_2=\overset{CH_3}{\underset{}{C}}-COOR_1,$$

$$CH_2=\overset{H}{\underset{}{C}}-COOR_1OR_1,\ CH_2=\overset{CH_3}{\underset{}{C}}-COOR_1OR_1,$$

an unsaturated hydrocarbon radical,

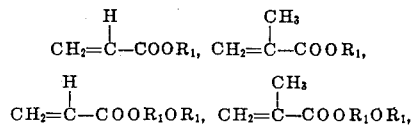

or

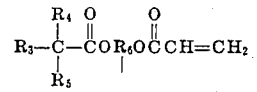

wherein $R_1$ is an alkylene radical, $R_3$ is an alkyl radical or hydrogen, $R_4$ is an alkyl radical or hydrogen, $R_5$ is an alkyl radical or hydrogen, and $R_6$ is a trivalent organic moiety, and $R'$ is selected from the group consisting of an alkyl radical and

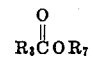

wherein $R_7$ is $R_1OR_1$, or $R_1$, and $R_2$ has the formula:

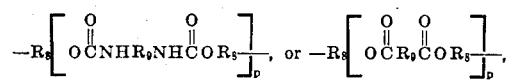

wherein $R_8$ is $-R_1[OR_1\!\!+\!\!_y$, $R_9[OR_1\!\!+\!\!_b$, or $R_9(COOR_1\!\!+\!\!_b$, $R_9$ is alkylene, arylene or aralkylene, $p$ is from 0 to 30, $y$ is from 0 to 20, $n$ is either 1 or 2, $L$ is either 0 or 1, and $n+m+L=3$, $b$ is 3 to 5, and $z$ is from 2 to 5, and $t$ is from 0 to 5; is useful as an adhesion promoter for substrates coated with actinic light-sensitive coatings and ionizing irradiation-sensitive coatings.

10 Claims, No Drawings

PHOSPHATE ESTERS AND THEIR USE AS ADHESIVE PROMOTERS

A method of forming coatings, having good strength, wear resistance, stain resistance, and other properties achievable only by extensive crosslinking of the coating material is that of coating a substrate with an ionizing radiation-sensitive coating or an actinic light-sensitive material such as polyacrylates and unsaturated polyester resins and subjecting the coatings to ionizing irradiation or actinic light to cure. This method of coating substrates is advantageous as the degree of crosslinking achieved thereby is unobtainable by any other method. It has been found, however, that these coating compositions are somewhat difficult to adhere to some substrates such as metal.

A novel class of phosphate esters has now been discovered which may be used as a pretreatment of substrates to enhance the adhesion of ionizing radiation-sensitive or actinic light-sensitive materials thereto or as an additive to the coating materials to increase the adhesion of the coatings to the substrates.

The novel phosphate esters of this invention have a formula selected from the group consisting of:

(A)
$$[R'O]_L-\underset{[OR]_m}{\overset{O}{\underset{\|}{P}}}-[OH]_n$$

wherein R is selected from the group consisting of:

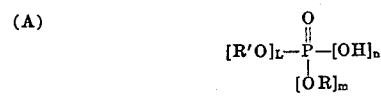

$$CH_2=\overset{CH_3}{\underset{|}{C}}-COOR_1OR_1, \text{ an}$$

unsaturated hydrocarbon radical,

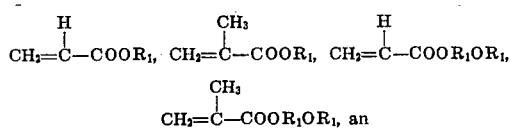

wherein $R_1$ is an alkylene radical and $R_3$ is hydrogen or an alkyl radical, $R_4$ is hydrogen or an alkyl radical, and $R_5$ is hydrogen or an alkyl radical, $R_6$ is a trivalent organic moiety and R' is selected from the group consisting of an alkyl radical and $$\overset{O}{\underset{\|}{R_3C}}OR_7$$

and $R_7$ is $R_1OR_1$ or $R_1$ and $n$ is either 1 or 2, $m$ is either 1 or 2, $L$ is either 0 or 1, and $n + m + L = 3$, and (B)
$$\left[\left[RO\right]\overset{O}{\underset{[OH]}{\overset{\|}{P}}}-O\right]_z R_2$$

wherein R is as described above, $R_2$ has the formula:

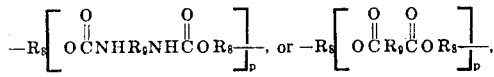

wherein $R_8$ is $-R_1[OR_1+_y$, $R_9[OR_1+_b$, or $R_9(COOR_1+_b$, $R_9$ is alkylene, arylene, or aralkylene, $p$ is from 0 to 30, $y$ is from 0 to 20, $b$ is 3 to 5, and $z$ is from 2 to 5, and (C)
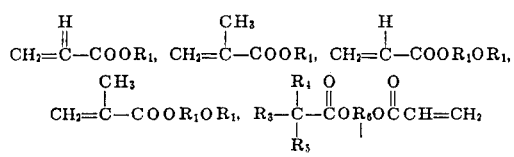

wherein R and $R_2$ are as described above and $t$ is from 0 to 5.

The radical R may be

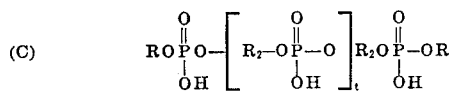

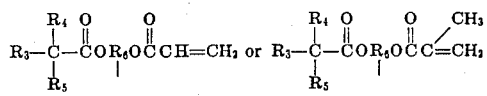

or

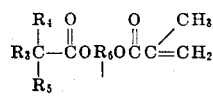

or an unsaturated hydrocarbon radical. The alkylene radical may be any unsaturated hydrocarbon such as vinyl, allyl, butylenyl and the like. Preferably, the unsaturated hydrocarbon radical contains up to about 13 carbon atoms.

$R_1$ may be any alkylene such as methylene, ethylene, propylene, butylene, heptylene and the like, and preferably contains from two to four carbon atoms. It is noted that where more than one $R_1$ radical is present, the $R_1$ radicals may be different species of the group $R_1$.

$R_3$, $R_4$, and $R_5$ may be hydrogen or an alkyl radical such as methyl, ethyl, butyl, octyl, decyl, lauryl, and the like. Generally, it is preferred that the alkyl contain from one to about 20 carbon atoms. Of course, $R_3$, $R_4$ and $R_5$ may be the same or different radicals, that is, when $R_3$ is ethyl, $R_4$ may be hydrogen and $R_5$ may be isopropyl.

$R_6$ is a trivalent organic moiety which is preferably a saturated hydrocarbon such as

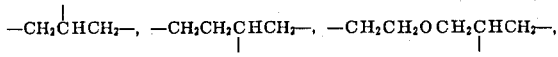

and the like. It is preferred that $R_6$ contains from about 2 to about 7 carbon atoms when it is a saturated hydrocarbon moiety.

The radical R' is either

or an alkyl radical wherein $R_7$ is $R_1$ or $R_1OR_1$. The preferred alkyl radicals for R' contain up to about 40 carbon atoms such as ethyl, butyl, hexyl, and the like.

The radical $R_2$ has the formula

or

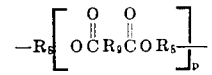

wherein $R_8$ is $-R_1[OR_{1+y}$, $R_9[OR_{1+b}$ or $R_9(COOR+_b$ and wherein $y$ is from 0 to 20 and $R_9$ is either an alkylene radical such as ethylene, propylene, isobutylene, octylene, and the like, an arylene radical such as phenylene, naphthylene, tolylene, and the like, or an aralkylene radical such as phenyl ethylene, phenyl propylene, and the like. It is preferred that $R_9$ contain from about two to about 30 carbon atoms. $p$ is from 0 to about 30.

The novel phosphate esters of this invention are prepared by reacting polyphosphoric acid or $P_2O_5$ with a hydroxy-containing ethylenically unsaturated monomer which is cross-linkable with either actinic light or ionizing irradiation. A hydroxy-containing saturated or non-ethylenically unsaturated moiety such as butanol, bis-hydroxyethyl maleate, bis-hydroxy-ethyl azelate, and the like, may also be reacted with the above reactants. The hydroxy may be primary, secondary or tertiary.

The reaction may be carried out at temperatures from about 20° to about 140°C. and requires no catalyst.

The anhydride equivalent ratio of polyphosphoric acid or $P_2O_5$ to the hydroxy-containing ethylenically unsaturated monomer is from about 1:1 to about 1:15. The preferred ratio is about 1:1. It is pointed out that less than 1:1 ratio leaves unreacted phosphate anhydride functionality which is undesirable. The hydroxy-containing saturated moiety may comprise up to about two times the molar amount of the hydroxy-containing ethylenically unsaturated monomer.

The above prepared phosphate esters are preferably used as pretreatments for substrates to be coated with actinic light-sensitive or ionizing irradiation-sensitive coatings.

Although any substrate material may be pretreated and coated as outlined above, such as metal, plastic, wood, cloth, and the like, because of the tremendous difficulty inherent in adhering radiation-sensitive coatings to metals, it is preferred that the substrate be a metal, such as aluminum or steel.

The actinic light-sensitive and ionizing irradiation-sensitive coating materials may be any radiation curable organic materials. The most useful radiation-sensitive organic materials are polyester resins and acrylic resins.

The polyester resins comprise unsaturated polyesters, solubilized in vinyl monomers. The unsaturated polyesters are ordinarily mixtures of alpha-beta ethylenically unsaturated polycarboxylic acids and polyhydric alcohols.

The ethylenically unsaturated polycarboxylic acids include such acids as:
 maleic acid
 fumaric acid
 aconitic acid
 mesaconic acid
 citraconic acid
 itaconic acid
and halo and alkyl derivatives of such acids and the like; the preferred acid being maleic acid. The anhydrides of these acids, where the anhydrides exist, are, of course, embraced under the term "acid," since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyesters include:
 ethylene glycol
 diethylene glycol
 triethylene glycol
 polyethylene glycol
 propylene glycol
 dipropylene glycol
 polypropylene glycol
 glycerol
 neopentyl glycol
 pentaerythritol
 trimethylol propane
 trimethylol ethane
and the like. The preferred polyols for the purposes of this invention have a molecular weight of less than about 2,000 and consist essentially of carbon, hydrogen and oxygen. The poly-hydric alcohols are generally employed in an equal molar-ratio to the total acid components, or as a slight excess, as, for example, about 5 mol percent excess.

Saturated dicarboxylic acids may be utilized in combination with the unsaturated acid or anhydride in the preparation of unsaturated polyesters. Such acids increase the length of the polyester without adding additional cross-linking sites, which is a desired feature in some polyesters. Examples of useful dicarboxylic acids which are either saturated or only aromatically unsaturated include:
 Succinic acid
 adipic acid
 suberic acid
 azelaic acid
 sebacic acid
 isophthalic acid
 terephthalic acid
 tetrachlorophthalic acid
and the like. As in the case of the ethylenically unsaturated acids, the anhydrides of these acids, where the anhydrides exist, are, of course, embraced in the term "acid," since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, whereever the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

Vinyl monomers which crosslink with unsaturated polyesters to form thermosetting materials may be interpolymerized with the acrylic compounds and polyesters, if desired. Such vinyl monomers may include:
 styrene
 alpha-methylstyrene
 divinylbenzene
 diallyl phthalate
 methyl acrylate
 methyl methacrylate
 hexyl acrylate
 octyl acrylate octyl methacrylate
diallyl itaconate
diallyl maleate
and the like. The preferred vinyl monomers are liquid compounds, soluble in the polyester components. Such monomers should preferably be free of non-aromatic carbon - carbon conjugated double bonds.

The vinyl monomer as exemplified in the above list may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer.

The preferred polyester resins are those formed from polyesters of propylene glycol or neopentyl glycol as the diol and maleic acid and isophthalic acid as the carboxylic acids with styrene or diallyl phthalate or vinyl toluene as the solubilizing monomer.

The acrylic compositions which may be used as the radiation-sensitive materials in this invention may be hydroxy-containing esters or amides of acrylic or methacrylic acid or co-monomers of such an ester with another copolymerizable monomer. Suitable esters include those of alcohols containing one to eight carbon atoms such as hydroxy methyl acrylate, hydroxy methyl methacrylate, hydroxy ethyl acrylate, hydroxy butyl methacrylate, hydroxy octyl acrylate, and hydroxy 2- ethoxy ethyl methacrylate. Suitable amides include hydroxy acrylamide, hydroxy methacrylamide, hudroxy tertiary butyl acrylamide and primary hydroxy alkyl acrylamides. Mixtures of such esters or amides may be copolymerized or one or more of the esters may be copolymerized with a higher alkyl ester or amide of acrylic or methacrylic acid or with another monomer containing a copolymerizable vinyl group, for example, itaconate esters, maleate esters, and allyl compounds. Alkylene dimethacrylates and diacrylates, such as 1,3-butylene dimethacrylate, and the like, and triacrylates and trimethacrylates, such as trimethyl propane trimethacrylate, and the like, may also be used. The preferred acrylates are polyacrylates and methacrylates, such as di- acrylates, di- methacrylates, tri- acrylates, tri- methacrylates, and the like, such as acryloxy pivalyl acryloxy pivalate, bis-(acryloxyethyl)-hexahydrophthalate and polymers thereof, bis-(acryloxyethyl) phthalate and polymers thereof, and the like. Examples of these materials are found in U. S. Pat. No. 3,455,802 and British Pats. Nos. 1,162,722 and 1,162,721. The preferred materials to be reacted with $P_2O_5$ or polyphosphoric acid are hydroxy ethyl acrylate and allyl alcohol.

The pretreatment of the substrate with the phosphate ester comprises applying a thin film of up to about 0.1 mil to the substrate by making a solution of about 5 to about 20 percent by weight of the ester in a low boiling solvent like acetone and drying the solvent.

The term "irradiation," as used herein, means high energy radiation and/or the secondary energies resulting from conversion of elctrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 20,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems comparable to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation".

The term "ionizing particle radiation" has been used to designate the emission of electrons or highly accelerated nuclear particles such as protons, neutrons, alpaparticles, deuterons, beta-particles, or their analogs, directed in such a way that the particle is projected into the mass to be irradiated. Charged partilces can be accelerated by the aid of voltage gradients by such devices as accelerators with resonance chambers, Van der Graaff generators, betatrons, synchrotons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of sutiable energy. This energy is conferred to the electrons by potential accelerators of over 0.1 million electron volts (mev.). In addition to irradiation of this type, commonly called X-ray, an ionizing electromagnetic irradation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Massachusetts, or other types of accelerators as described in U.S. Pat. No. 2,763,609 and in British Pat. No. 762,953 are satisfactory for the practice of this invention.

The term "actinic light", in general, refers to the use of wave lengths of approximately 1,800 to 4,000 angstrom units. Various suitable sources of the actinic light are available in the art including, by way of example, mercury lamps, black lights, ultraviolet cored carbon arcs, and high-flash lamps.

If actinic light is used to cure the material, it is desirable to add photosensitizers such as benzoin, benzoin methyl ether, diphenyl disulfide, dibenzyl disulfide, benzyl, and the like. Generally, the material may comprise from about 0.1 percent by weight of the photosensitizers to about 5 percent by weight of the photosensitizers.

The phosphate esters may also be cured by any free radical mechanism such as peroxide cures. In this case, it is preferable to cure in the absence of air.

As an alternative method of adhering the coatings to the substrate, the phosphate esters may be used as an additive to the coating materials to be used. The materials may be mixed without the use of heat or catalyst and generally the mixture should contain at least about 0.1 percent by weight of the phosphate ester.

The coated substrates produced by the methods of this invention may be used as conduits, interior coated metal articles such as filing cabinets, exterior coated articles such as aluminum siding, and the like.

The following examples set forth specific embodiments of the invention. However, the invention is not to be construed as being limited to these embodiments for there are, of course, numerous possible variations and modifications. All parts and percentages of the examples as well as throughout the specification are by weight unless otherwise indicated.

EXAMPLES 1-3

A reactor was charged with 371 grams of 2-hydroxyethyl acrylate and 1 gram of hydroquinone and heated to 50°C. Over a 1-hour period, 142 grams of $P_2O_5$ were added at temperatures from 65°C. to 70°C. The final product had an acid value of 305.26 and a mixture of materials having the structures:

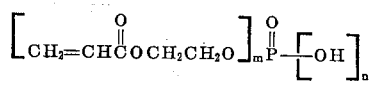

wherein
 $n = 1$ or $2$
 $m = 1$ or $2$
 $n + m = 3$

An ionizing-irradiation sensitive coating material was tested for adhesion to various substrates both with and without the addition of the novel phosphate ester of this invention. In each case the phosphate ester above was used in different amounts with acryloxy pivalyl, acryloxy pivalate.

Different substrates were used for the tests and the coatings were cured by subjecting to electron beam bombardment at 500 kilovolts to a total dosage of 3 megarads in a nitrogen atmosphere. The coated panels were tested for adhesion by the Tape Test which consists of bumping the panels with a force of 20,40 and 60-inch pounds and then scratching an X shape on the panel with a knife and pressing cellophane tape on to the area and then peeling off. The adhesion of the coating is measured by the amount of coating peeled off with the tape.

The results were as follows in Table 1:

| Ex. | % Product of Phosphate Ester | Substrate | Adhesion |
|---|---|---|---|
| A | 0 | Dipped galvanized steel | taped off |
| 1 | 0.2 | Dipped galvanized steel | slight tape off |
| B | 0 | Pickled steel | taped off |
| 2 | 0.2 | Pickled steel | taped off |
| C | 0 | Aluminum | taped off |
| 3 | 0.2 | Aluminum | no tape off |

As seen from the results above, the radiation-sensitive materials when combined with the novel phosphate ester of this invention have much improved adhesion over the materials alone.

EXAMPLES 4-6

Bis-(acryloxyethyl) hexahydrophthalate was tested for adhesion to various substrates both with and without the addition of the novel phosphate ester of Example 1.

Tests similar to that of Examples 1-3 were run to determine the adhesion of the materials to the various substrates. The following results were obtained:

| Ex. | % Product of Phosphate Ester | Substrate | Adhesion |
|---|---|---|---|
| D | 0 | Dipped galvanized steel | taped off |
| 4 | 5.0 | Dipped galvanized steel | no tape off |
| E | 0 | Pickled steel | taped off |
| 5 | 5.0 | Pickled steel | no tape off |
| F | 0 | Aluminum | taped off |
| 6 | 5.0 | Aluminum | no tape off |

EXAMPLES 7-9

Bis-(acryloxyethyl) phthalate was tested for adhesion to various substrates both with and without the addition of the novel phosphate ester of Example 1.

Tests similar to those of Examples 1-6 were run to determine the adhesion of the materials to the various substrates. The following results were obtained:

| Ex. | % Product of Phosphate Ester | Substrate | Adhesion |
|---|---|---|---|
| G | 0 | Dipped galvanized steel | taped off |
| 7 | 7.0 | Dipped galvanized steel | no tape off |
| H | 0 | Pickled steel | taped off |
| 8 | 7.0 | Pickled steel | no tape off |
| I | 0 | Aluminum | taped off |
| 9 | 7.0 | Aluminum | no tape off |

EXAMPLES 10-12

Bis-(acryloxyneopentyl) adipate was tested for adhesion to various substrates both with and without the addition of the novel phosphate ester of Example 1.

Tests similar to that of Examples 1-9 were run to determine the adhesion of the materials to the various substrates. The following results were obtained:

| Ex. | % Product of Phosphate Ester | Substrate | Adhesion |
|---|---|---|---|
| J | 0 | Dipped galvanized steel | taped off |
| 10 | 1.2 | Dipped galvanized steel | no tape off |
| K | 0 | Pickled steel | taped off |
| 11 | 1.2 | Pickled steel | taped off |
| L | 0 | Aluminum | taped off |
| 12 | 1.2 | Aluminum | no tape off |

EXAMPLE 13

The effect of a pretreatment with the novel phosphate esters of this invention on adhesion was tested by coating an untreated substrate with a radiation-sensitive coating and a treated substrate with the same coating and comparing the adhesion.

An aluminum panel and tin-free steel panel were treated by dipping the panels into a 10 percent solution of the phosphate ester of Example 1 in acetone and dried at 100°F. in an oven. A 0.6 mil drawdown coating of bis-(acryloxyethyl) hexahydrophthalate was made on both the above treated panels and two untreated panels and cured by subjecting to electron beam impingement to a total dosage of 3 megarads in nitrogen.

The untreated panels showed very poor adhesion while the treated panels had outstanding adhesion.

According to the provisions of the patent statutes, there is described above the invention and what are now considered to be its best embodiments. However, within the scope of the appended claims, it is to be understood that the invention can be practiced otherwise than as specifically described.

We claim:

1. The method of forming an adherent coating on a substrate comprising mixing an ionizing irradiation-sensitive coating material with a compound having the formula selected from the group consisting of (A) 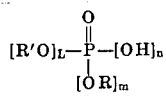

wherein R is selected from the group consisting of

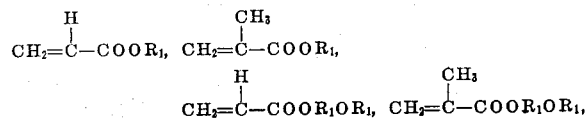

an unsaturated hydrocarbon radical,

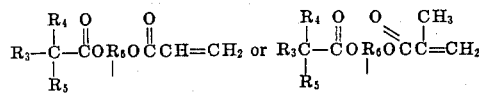

wherein $R_1$ is an alkylene radical, $R_3$ is an alkyl radical or hydrogen, $R_4$ is an alkyl radical or hydrogen, $R_5$ is an alkyl radical or hydrogen, and $R_6$ is a trivalent organic moiety, and R′ is selected from the group consisting of an alkyl radical and

wherein $R_7$ is $R_1OR_1$ or $R_1$ and $n$ is either 1 or 2, $m$ is either 1 or 2, $L$ is either 0 or 1, and $N + M + L = 3$, and (B) 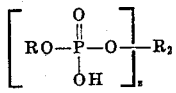

wherein R is as above, $R_2$ has the formula

or

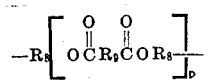

wherein $R_8$ is $R_1[OR_1+_y]$, $R_9[OR_1+_b]$, or $R_9(COOR_1+_b)$ wherein $R_1$ is as above, $R_9$ is alkylene, arylene, or aralkylene, $p$ is from 0 to 30, $y$ is from 0 to 20, $b$ is from 3 to 5, and $z$ is from 2 to 5, and (C) 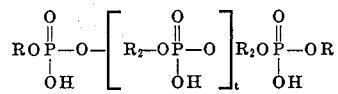

wherein R and $R_2$ are as above and $t$ is from 0 to 5, and applying to the substrate and subjecting the coated substrate to ionizing irradiation.

2. The method of claim 1 wherein the coating is subjected to a total dosage of from about 0.2 megarad to about 300 megarads.

3. The method of claim 1 wherein the coating material is acryloxy pivalyl, acryloxy pivalate.

4. The method of claim 1 whrein the coating material is bis-(acryloxyethyl) hexahydrophthalate.

5. The method of claim 1 wherein the coating material is bis-(acryloxyethyl) phthalate.

6. The method of forming an adherent coating on a substrate comprising applying to the substrate a compound having the formula selected from the group consisting of (A) 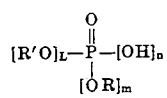

wherein R is selected from the group consisting of

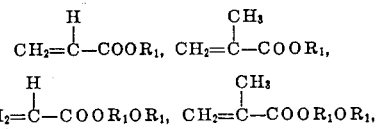

an unsaturated hydrocarbon radical,

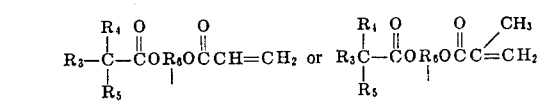

wherein $R_1$ is an alkylene radical, $R_3$ is an alkyl radical or hydrogen, $R_4$ is an alkyl radical or hydrogen, $R_5$ is an alkyl radical or hydrogen, and $R_6$ is a trivalent organic moiety, and R′ is selected from the group consisting of an alkyl radical and

wherein $R_7$ is $R_1OR_1$ or $R_1$ and $n$ is either 1 or 2, $m$ is either 1 or 2, $L$ is either 0 or 1, and $n + m = L = 3$, and (B) 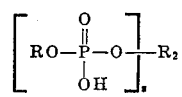

wherein R is as above, $R_2$ has the formula

wherein $R_8$ is $R_1[OR_1+_y]$, $R_9[OR_1+_b]$, or $R_9(COOR_1+_b)$ wherein $R_1$ is as above, $R_9$ is alkylene, arylene, or aralkylene, $p$ is from 0 to 30, $y$ is from 0 to 20, $b$ is from 3 to 5, and $z$ is from 2 to 5, and (C) 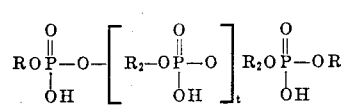

wherein R and $R_2$ are as above and $t$ is from 0 to 5, and subsequently applying an ionizing irradiation-sensitive coating material to the substrate and subjecting the coated substrate to ionizing irradiation.

7. The method of claim 6 wherein the coating is subjected to a total dosage of from about 0.2 megarad to about 300 magarads.

8. The method of claim 6 wherein the coating material is acryloxy pivalyl, acryloxy pivalate.

9. The method of claim 6, wherein the coating material is bis-(acryloxyethyl) hexahydrophthalate.

10. The method of claim 6 wherein the coating material is bis-(acryloxyethyl) phthalate.

* * * * *

UNITED STATES PATENT OFFICE
CERTIFICATE OF CORRECTION

Patent No. 3,754,972　　　　　　　　Dated August 28, 1973

Inventor(s) Robert DeMajistre et al

It is certified that error appears in the above-identified patent and that said Letters Patent are hereby corrected as shown below:

First inventors name "Robert de Majistre" should be --Robert DeMajistre--.

Claim 1, line 60, "$R_1[OR_1+_y$, $R_9[OR_1+_b$" should be -- $R_1[OR_1\}_y$, $R_9[OR_1\}_b$ --.

Claim 4, "whrein" should be --wherein--.

Claim 6, line 55, "$R_8\text{-}[O\overset{O}{\overset{\|}{C}}NHR_9NH\overset{O}{\overset{\|}{C}}OR_8]_p$" should be -- $\text{-}R_8[O\overset{O}{\overset{\|}{C}}NHR_9NH\overset{O}{\overset{\|}{C}}OR_8]_p$ --.

line 59, "$R_1[OR_1+_y$, $R_9[OR_1+_b$" should be -- $R_1[OR_1\}_y$, $R_9[OR_1\}_b$ --.

Signed and sealed this 25th day of December 1973.

(SEAL)
Attest:

EDWARD M. FLETCHER, JR.　　　　　RENE D. TEGTMEYER
Attesting Officer　　　　　　　　　Acting Commissioner of Patents